Feb. 13, 1962  R. T. DALY  3,021,448
ATOMIC BEAM FREQUENCY STANDARD
Filed Feb. 20, 1959  6 Sheets-Sheet 1

INVENTOR.
RICHARD T. DALY
BY Darby & Darby
ATTORNEYS

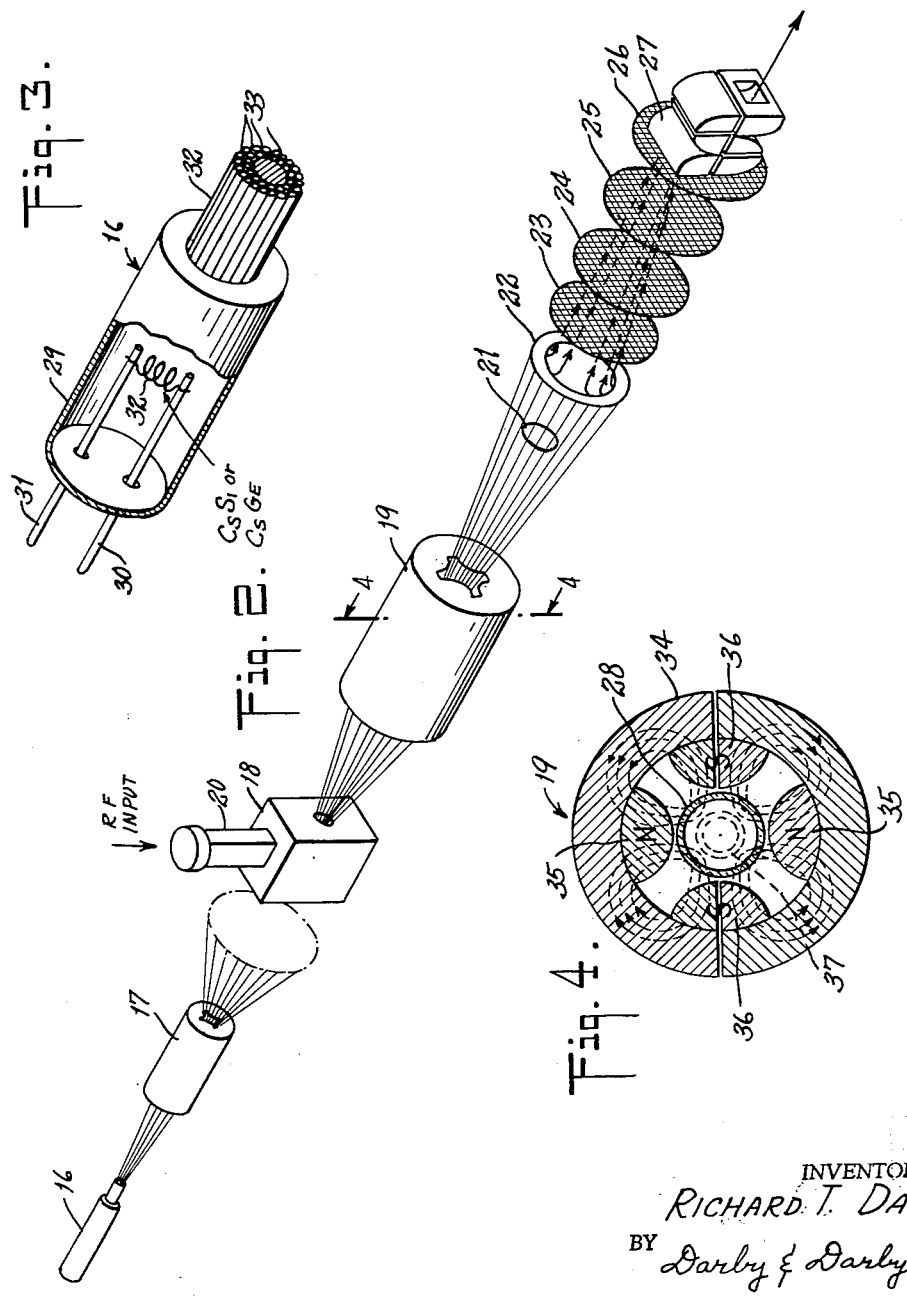

Feb. 13, 1962  R. T. DALY  3,021,448
ATOMIC BEAM FREQUENCY STANDARD
Filed Feb. 20, 1959  6 Sheets-Sheet 3
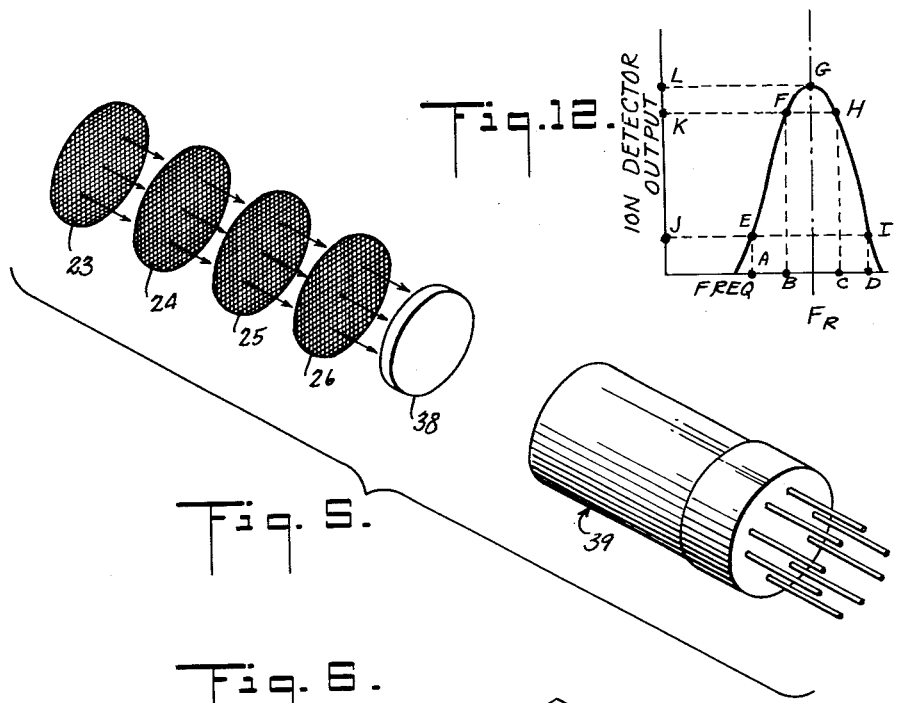
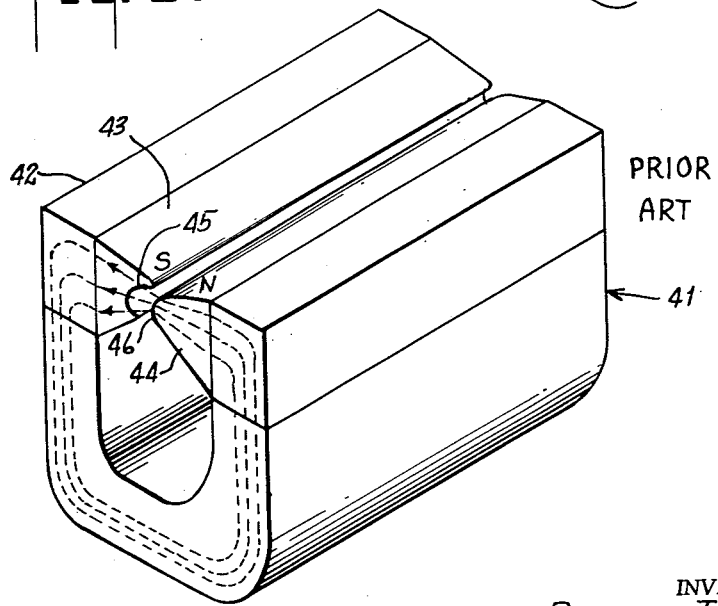
PRIOR ART
INVENTOR.
RICHARD T. DALY
BY Darby & Darby
ATTORNEYS Feb. 13, 1962 R. T. DALY 3,021,448
ATOMIC BEAM FREQUENCY STANDARD
Filed Feb. 20, 1959 6 Sheets-Sheet 4

INVENTOR.
RICHARD T. DALY
BY Darby & Darby
ATTORNEYS

Feb. 13, 1962   R. T. DALY   3,021,448
ATOMIC BEAM FREQUENCY STANDARD
Filed Feb. 20, 1959   6 Sheets-Sheet 6

INVENTOR.
RICHARD T. DALY
BY Darby & Darby
ATTORNEYS 3,021,448
ATOMIC BEAM FREQUENCY STANDARD
Richard T. Daly, New Rochelle, N.Y., assignor to TRG, Incorporated, Syosset, N.Y., a corporation of New York
Filed Feb. 20, 1959, Ser. No. 794,677
9 Claims. (Cl. 315—5.35)

The present invention relates to atomic beam frequency standards and more particularly to such frequency standards wherein a conventional oscillator such as a crystal controlled oscillator is stabilized by an atomic electron precession frequency.

The value of such frequency standards utilizing the electron precession frequency of a particular chemical element as a reference lies in the extreme constancy of such electron precession frequencies. By utilizing an electron precession frequency as a reference it is possible to construct a frequency standard having an accuracy of the order of one part in one billion or better. This degree of accuracy can best be appreciated by describing it in terms of its use as a time measuring device or clock. If such a frequency standard were utilized as a time measuring device, it would insure an accuracy of better than one second in 30 years.

Frequency standards utilizing electron precession frequencies as references have been known previously. Previous standards of this type have, however, been unsuitable for most practical applications and particularly for military applications where high degrees of serviceability, ruggedness, service life and shelf life are demanded. The present invention provides an atomic beam frequency standard which is particularly adapted to provide an efficient, rugged, compact and readily serviceable device.

A general explanation of the principles of operation of the device will be helpful in understanding the novel features and advantages of applicant's apparatus. In the description and explanation of the apparatus it will be assumed that atoms of the element cesium will be used in the apparatus as a frequency reference. It should be understood that other elements whose atoms have suitable electron precession frequencies could be used as a frequency reference.

Cesium atoms for use in the present apparatus may be obtained simply by subjecting cesium or a cesium compound to heat so that cesium atoms in vaporized form are given off. If these atoms are produced in a substantially evacuated enclosure, the cesium atoms would normally be given off in all directions with varying velocities and would not form a suitable beam. However, if a small diameter tube is provided through which the cesium atoms must pass, the beam will tend to be guided in the proper direction. The speed of the particles will be approximately that of sound in the vapor, about 600 feet per second.

The outer electron belonging to each cesium atom which diffuses from such an array of tubes spins rapidly on its axis and may be in one of two possible modes of precession. The electron may be visualized as executing a constant precessional motion similar to that of a gyroscope when its axis is inclined at a small angle to the gravitational field and it is supported at one end of its axis. The two modes correspond respectively to the case where the electrons spin direction is the same as that of the cesium nucleus which is also spinning, and to the case where the spin directions are opposite.

The important fact about these complicated states or modes of motion is that when injected into a very non-uniform magnetic field, atoms in one of these modes will be attracted to regions of the magnetic field where the field strength is high. The other mode is attracted to regions of the magnetic field where the field is weak. Thus the atomic beam, when directed into a non-uniform magnetic field splits into two components, one consisting substantially of atoms in one precessional mode and the other consisting substantially of atoms in the opposite precessional mode. Atoms will be thus deflected by a magnetic field even though the atoms are not electrically charged.

If one of the components of the atomic beam containing atoms of a single precessional mode is selected from the magnetic field and passed through an oscillating magnetic field such as might exist inside a microwave resonant cavity, it will be found that the beam will change into the opposite mode when the oscillation frequency is at or very close to that corresponding to the electron precessional frequency, in a resonance-type phenomenon. This resonance condition can be determined by subsequently passing the beam through another non-uniform magnetic field similar to the first. The direction of deflection of atoms in this second magnetic field will indicate that certain of the atoms have had their precessional mode switched or reversed by the oscillating magnetic field.

Since the atoms of cesium are not charged it is somewhat difficult to detect them directly. They may readily be detected however by causing them to be directed at an incandescent tungsten molybdenum, iridium, paladium or platinum wire. The phenomenon of surface ionization will cause impinging atoms to be reflected from the wire as positively charged ions. The charged atoms having thus been ionized can be manipulated with electric fields in conventional manner and finally measured as an electrical current.

In many cases it will be desirable to eliminate from the stream of ionized particles all atoms other than cesium atoms. Such non-cesium atoms would constitute background noise which would deteriorate the accuracy and sensitivity of the apparatus. One possible source of impurities is the tungsten wire which normally contains impurities such as potassium which also evaporates to produce charged potassium atoms.

The removal of these unwanted atoms may be accomplished by the use of some type of mass spectrometer apparatus. Preferably a time-of-flight type mass spectrometer apparatus is incorporated at a point after the beam of atoms is ionized. Such apparatus is known in the art and may be described briefly as a series of accelerating and decelerating grids. Time alternating voltages are applied to the grids in such a manner that atoms only of a selected mass are accelerated through the series of grids. The acceleration of atoms of a specific mass is such that they are attracted by the grid immediately in front of them and repelled by the grid immediately in back of them. Atoms of a different mass are not accelerated to such a great degree and thus do not reach nearly as great a velocity. The atoms of the selected mass are therefore accelerated to a velocity sufficient to pass through a final gating grid while atoms of different masses are blocked or turned back by the gating grid. In this manner the ions of cesium which are to be measured are passed through the time of flight spectrometer apparatus while atoms of other elements representing impurities in the system are blocked and consequently do not produce any effect on the final detector apparatus.

In the present invention a novel combination including a radial magnetic field producing arrangement is utilized. This arrangement produces a magnetic field which varies radially from the center of the atomic beam outwardly toward the periphery of the beam. When the beam is subjected to the radially non-uniform magnetic field the atoms of one precessional mode are caused to be deflected outwardly and thus to be removed from the beam while atoms of the opposite precessional mode are caused to converge and thus form a thin dense beam of atoms to be acted upon by the oscillating magnetic field of the mode-switching resonant cavity.

After the atoms pass through the mode-switching resonant cavity they are again passed through a similar magnetic field having a radial non-uniformity. At this point the atoms to be rejected may be focused to a point where they strike a small intercept plate in the center of the beam path. On the other hand atoms to be detected are caused to diverge where they impinge upon a ring-shaped incandescent tungsten, platinum or other suitable ionizing element.

Numerous advantages accrue from the use of a radially non-uniform magnetic field. Since the magnetic field is symmetrical it will allow the magnet to be disassembled without significantly reducing its magnetization as will later be explained in more detail. Furthermore, stray magnetic fields external to the magnet structure in the R.F. cavity region are virtually eliminated. Stray magnetic fields in the apparatus and particularly those in the region of the resonant cavity may produce very undesirable effects upon the constancy of the precessional rate of the electrons in each cesium atom.

The circular symmetry provided by the present apparatus has another advantage in that the beam path of the atoms through the apparatus is a straight line. In previous atomic beam devices the path of the beam was curved or zig-zag due to the deflection of the beam by non-symmetric magnetic fields.

A still further advantage accrues from the use of symmetric magnetic deflecting fields in the present apparatus. The use of such a field causes the atoms to be collected to be deflected into a diverging annular beam. This allows the use of an annular ionizing ring. This configuration has several advantages over a rectilinear ionizing surface. First the efficiency of ion collection from the ionizer is improved by a factor of at least two. Furthermore the interception area of the ionizer surface is improved by a factor of approximately 15 over the conventional ionizer surface design. The circular symmetry and radial variation of the magnetic field causes the magnet to act in a manner analogous to a converging lens and thus causes the atoms to be directed with greatly improved efficiency to the ionizer surface as will later be explained in greater detail. It will therefore be appreciated that the circularly symmetrical configuration of magnetic field and atom beam of the present apparatus provides many advantages; these advantages will be further elaborated in the detailed explanation of the apparatus.

Thus far only the frequency reference or comparison apparatus of the present invention has been described, that is, apparatus to which a radio frequency signal may be applied and a comparison made with a constant atomic electron precession frequency. The complete atomic beam frequency standard also includes a stable oscillator of conventional type together with apparatus for correcting the frequency of the oscillator in response to deviation of the frequency of a signal derived from said oscillator as compared with the electron precessional frequency of the atomic frequency reference apparatus previously described.

It is generally not practical to provide an oscillator having a frequency equal to the reference frequency of the atomic reference apparatus. A conventional crystal controlled oscillator is accordingly constructed to have a frequency substantially lower than the electron precessional frequency of the atom of the element being utilized. The oscillator frequency is then multiplied or otherwise altered upward to produce the frequency of the atomic frequency reference apparatus.

In order to correct the frequency of the crystal controlled oscillator to provide the exact atomic reference frequency it is necessary to sense not only the departure of this frequency from the reference frequency, but also the sense or direction of the error. This is accomplished in the present apparatus by frequency modulating the signal from the crystal controlled oscillator over a narrow range of frequency. This produces a cyclic variation in the error signal from the atomic reference apparatus and the phase relation of the error signal relative to the frequency modulating signal applied to the crystal controlled oscillator signal is an indication of the sense or direction of the error between the crystal oscillator-derived signal and the atomic reference frequency. The relative phase of these two signals can be detected and converted into a signal whose polarity is indicative of the direction of error and which has a magnitude indicative of error magnitude and this signal can be applied to correct the frequency of the crystal controlled oscillator. This is the technique utilized in the present invention to correct the crystal controlled oscillator frequency in response to deviations of a derived signal frequency from the atomic reference frequency. It should be understood that other known techniques could be utilized to provide a feedback or servo action which would cause the deviation of the crystal controlled oscillator frequency to be automatically corrected.

It is generally desired that the frequency of the output of a frequency standard be a "round" number. For example, a frequently required output frequency is one hundred kilocycles. On the other hand, the electron precessional frequency of usable elements such as cesium is not a round number. A useful electron precessional frequency of cesium, for example is 9192.631830 megacycles. It will be appreciated that the problem of converting a frequency of 100 kilocycles or an even multiple thereof to the cesium electron precessional frequency correct to nine places is a formidable one which would normally require a very large number of frequency multipliers, frequency dividers and mixers in order to synthesize such a complicated number to nine places.

In the present invention, however, the apparatus is provided in which the cesium electron precessional frequency is synthesized by multiplication and addition only to five places and the remaining significant figures of the complicated number are accurately provided by an auxiliary crystal oscillator whose frequency is mixed with the various frequencies derived from the first oscillator by addition and multiplication. By this means a great deal of complex apparatus is eliminated thus greatly improving the reliability of the overall apparatus. At the same time, the use of the auxiliary crystal is such that the error due to the auxiliary crystal is insignificant in the final result compared with other inaccuracies of the system. It will be understood that the particular number of digits synthesized from the first oscillator and the number of digits derived from the auxiliary oscillator is subject to variation and may be determined with due consideration for the intrinsic stability of the auxiliary oscillator and the desired overall system error. In the case of an intrinsically unstable auxiliary oscillator and high degree of overall stability desired, the auxiliary oscillator should provide fewer digits and direct synthesis should provide more digits; in a situation where the opposite conditions existed obviously the converse of the above statement would apply.

In addition to the objects and advantages of the present apparatus which are described and explained above, it is an object of the present invention to provide an atomic beam frequency standard wherein the magnetic deflecting fields and the atomic beam are circularly symmetrical and in which the atom beam path is linear through the length of the atomic beam tube.

It is a further object of the present invention to provide an atomic beam frequency standard in which the deflecting magnets may be located exterior to the atomic beam tube envelope and may be dis-assembled from the tube without causing appreciable de-magnetization of the deflecting magnets.

It is a still further object of the present invention to provide an atomic beam frequency standard which is particularly rugged and efficient and has an inherently long service life.

Other objects and advantages of the present invention will be apparent from a consideration of the following description and explanation in conjunction with the appended drawings, in which:

FIG. 2 is a partially schematic isometric view of an atomic beam frequency reference tube in which the envelope has been omitted for the sake of clarity;

FIG. 3 is an isometric view of an atomic beam emitter and director partially cut away to show the heating element for the emitter;

FIG. 4 is a transverse sectional view taken along the line 4—4 in FIG. 2 showing a magnet according to the invention for producing the atomic beam deflecting magnetic field;

FIG. 5 is a partially schematic isometric view of an alternative ion detector apparatus for the atomic beam frequency reference tube of FIG. 2;

FIG. 6 is an isometric view of a prior art type of atomic beam deflecting magnet;

FIG. 12 is a graph of frequency to be compared versus ion detector output of the atomic beam frequency reference apparatus useful in explaining the operation of the complete combination forming the atomic beam frequency standard.

Figure 1:
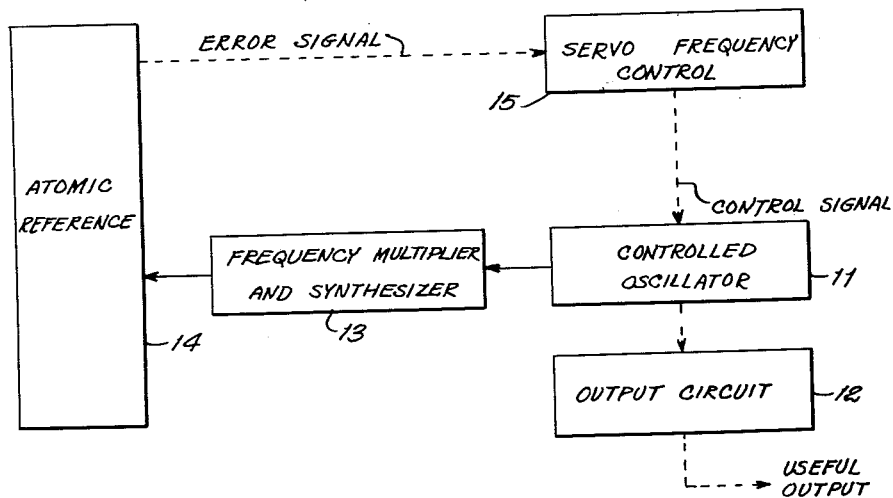
FIG. 1 is a block diagram of an atomic beam frequency standard according to the present invention.

Referring now to the drawings and particularly to FIG. 1, there is shown a block diagram of a complete atomic beam frequency standard apparatus. A controlled oscillator, exemplified as a quartz crystal oscillator, is shown at 11 which provides a useful output signal in the form of an alternating electrical current. In some cases the actual output signal may be converted in frequency as by multiplication or division, and amplified where desired as by the output circuit indicated in block form at 12.

The frequency of the controlled oscillator 11 is determined partly by its normal frequency alone, and partly by the atomic reference 14 through the action of a control signal. Although the normal frequency of the quartz crystal is compared to the atomic reference frequency and is corrected to a certain degree, the accuracy of the quartz crystal oscillator is an important factor in the overall accuracy of the system. This may be inferred from the limiting case of a crystal oscillator which is perfectly stable in frequency; in this case the atomic reference and servo amplifier could be eliminated altogether. In a practical case the crystal oscillator is not perfect but contributes a substantial amount of rate or frequency variation which must be corrected or reduced in magnitude by the remaining components of the system. It is necessary to point out that the atomic reference, the servo frequency control and the frequency multiplier and synthesizer are not perfect either. In operation, they contribute rate or frequency variations to the overall system also.

Actually, the atomic reference frequency is considerably more accurate than one part in one billion, and the crystal oscillator is considerably less accurate than one part in one billion, being generally accurate to something of the order of one part per million. The overall system accuracy can be made to approach the accuracy of the atomic reference to the degree that the servo frequency control system is capable of locking the crystal oscillator frequency on the atomic reference frequency. No servo control system is perfectly accurate and thus the accuracy of the overall system lies somewhere between the accuracy of the crystal oscillator and the accuracy of the atomic reference. One limiting factor in the accuracy of the servo frequency control system, for example, is the unavoidable delay in servo response due to the transit time of the cesium atoms from the resonant cavity to the detector apparatus. Of course, there are other limiting factors of the servo frequency control circuit accuracy.

From the foregoing description of some of the factors entering into the accuracy of the overall system it is obvious that the crystal oscillator should be selected to have as great an accuracy as possible. A suitable crystal oscillator unit for use in the present apparatus is the O–(XA–31)/u. oscillator developed by Wright Air Development Center. Obviously other crystal oscillators could be utilized in the present invention but it should be understood that an oscillator of a high degree of accuracy should preferably be utilized.

A frequency multiplier and synthesizer is indicated in block form at 13. This unit is a frequency converter or electrical gear train. The output frequency of this unit is a function of its input frequency. The need for this unit arises because the precession rate or frequency of the electron in the atomic reference rarely corresponds to a desired rate or frequency of useful output or an even multiple or sub-multiple thereof. As previously explained a desired output frequency may be 100 kilocycles per second while the electron precessional frequency of cesium, for example, is 9192.631830 megacycles per second. It is therefore necessary for the frequency multiplier and synthesizer 13 to convert an input frequency from the oscillator 11, which is preferably a round number such as 100 kilocycles, 1 megacycle or some multiple thereof, into the atomic reference frequency. This must be done with an accuracy better than one part in one billion.

For certain applications it may be unnecessary to provide a useful output which is a round number; in some instances an output of any frequency would be suitable so long as the frequency is constant within the narrow limits. In such a case an output frequency may be established which is the exact sub-multiple or multiple of the electron precessional frequency. Thus the crystal oscillator may be designed to operate at a sub-multiple or a multiple frequency, and a straightforward frequency multiplier or divider circuit may be utilized to multiply or divide the crystal oscillator frequency by the factor necessary to bring it to the value of the electron precessional frequency which must be supplied to the atomic reference 14.

The atomic reference is shown in block form at 14. This apparatus accepts the output signal from the frequency multiplier and synthesizer and compares it with the atomic electron precessional frequency. Any difference between these two frequencies is indicated by an error signal produced from the atomic reference 14.

The error signal from the atomic reference is fed to a servo frequency control indicated in block form at 15. The servo frequency control 15 is a servo or feedback control system which is adapted to control the quartz crystal oscillator in such a way as to reduce the frequency error sensed by the atomic reference to a minimum. In the preferred form of the apparatus shown herein this is accomplished by frequency modulating the output of the quartz crystal oscillator 11 over a narrow range of frequency so that the sense or direction of frequency error can be determined by a phase comparison of the error signal phase with the phase of the frequency modulating signal. Of course any other suitable technique could be utilized to provide feedback frequency control.

Since an understanding of the operation of the atomic beam frequency reference 14 is essential to an understanding of the operation of the system, this apparatus will be explained first. The atomic beam frequency reference 14 is shown in a partially schematic isometric view in FIG. 2. In FIG. 2 various electrical connections to certain of the elements have been omitted for simplicity since the proper construction and operation of these connections is well known in the art. Also, the envelope of the evacuated tube which would enclose most of the elements of FIG. 2 has also been omitted for clarity. This envelope is a rectilinear generally cylindrical evacuated enclosure, made of non-magnetic material, preferably glass, although a non-magnetic metal envelope may be used. It may have a uniform diameter, or portions of respectively different diameter to accord with the beam size at different portions of the beam path. The cesium atom source is shown at 16 in FIG. 2. A more detailed view of the source 16 is shown in FIG. 3. The cesium atom source 16 comprises an enclosure 29 in one end of which are inserted electrical leads 30 and 31. The leads 30 and 31 provide an electrical circuit for a filament 32. The filament 32 is the heater for the cesium atom source 16. Preferably the filament 32 is formed of an inter-metallic compound or an alloy of cesium such as cesium and silicon (CsSi) or cesium and germanium (CsGe). When current is supplied to the filament 32, the filament is heated and some of the cesium of the filament effuses, filling the inside of the small enclosure 29 with vapor.

Other forms of cesium atom sources could be utilized in the present invention if desired. However, the preferred embodiment shown in FIG. 3 has novel features which are very advantageous and serve to provide a more practical apparatus.

In previous cesium atom beam devices, liquid metal emitters have been utilized in which a pool of liquid cesium (the melting point of cesium is approximately 28.5° C.) is placed in an enclosure and heated to cause atoms of cesium to effuse from the liquid and to be ejected from an aperture in the enclosure. In such an arrangement the production of the cesium vapor in the enclosure is a function of the temperature. Unfortunately, the temperature of operation to provide the desired rate of production of cesium atoms lies generally in the range around 70° C. and the rate of effusion of atoms increases rapidly with temperature. Therefore, if reliable operation or long time storage is anticipated in an ambient temperature which approaches or exceeds 70° C. such an elemental cesium emitter will obviously be subject to many disadvantages. During storage the vapor composed of cesium atoms will effuse even though no power is applied to the cesium source heater. In addition, when the cesium atom emitter is operating and the ambient temperature approaches 70° C. the rate of flow of cesium atoms will vary. This will produce an inefficient utilization of the cesium and may produce other undesirable effects.

In the cesium emitter shown in FIG. 3, elemental cesium, which must be utilized in liquid form, is not used. On the other hand, an inter-metallic compound or alloy of cesium is used. The composition of this alloy is such that only at relatively high temperatures such as of the order of 600–700° C. will the cesium leach out leaving behind a less volatile component. Since the reaction proceeds only at temperatures well in excess of the expected ambient temperature, the rate of cesium vapor formation is subject to accurate control at all times. Moreover, intermittent operation alternated with inactive or storage periods does not adversely effect this emitter. Many compounds of cesium may be suitable for use as emitters. Two intermetallic compounds which may be utilized, for example, are CsSi and CsGe. These compounds undergo the following reactions at a temperature range of approximately 600 to 700° C.

$$4CsGe \rightarrow 3Cs + CsGe_4$$
$$8CsSi \rightarrow 7Cs + CsSi_8$$

It should be noted that the use of compounds rather than pure elemental cesium does not seriously affect the efficiency of cesium atom production since approximately 48% (by weight) of the first compound above converts into available cesium and approximately 71% of the second compound converts into available cesium.

The invention is of course not limited to the particular compounds noted which are material by way of illustration, and other compounds might be utilized. A further compound which might be utilized is an interstitial compound of graphite and cesium. This combination has the effect of depressing the vapor pressure of the cesium at any given temperature thus allowing the emitter to be operated at a higher temperature for a given required vapor pressure.

In connection with the emission and control of cesium atoms there is another problem which should be mentioned. In the course of operation of the apparatus, cesium atoms which have been deflected from the cesium atom beam will tend to condense on the walls or other portions of the atomic beam reference tube. This condensed cesium may tend to evaporate to produce stray cesium particles. These particles may migrate down the tube by successive condensation and evaporation and finally reach the detection apparatus and produce a background signal tending to reduce the sensitivity of the apparatus.

To minimize the above effect a getter may be utilized in a fashion well known in the electron tube art to cause stray cesium atoms to be collected by combination with the getter material and thus prevent them from adversely affecting the operation of the tube. Any chemical element or compound having an affinity for cesium may be used. As an example, lead oxide may be utilized to combine with cesium to produce a stable compound which retains the cesium, thereby removing the stray cesium atoms.

According to one aspect of the present invention, an improved getter material is provided for this purpose. A material having particular advantage is cupric oxide which efficiently combines with cesium to form a relatively stable compound. In addition, this compound changes color according to the amount of cesium in combination. According to one aspect of the present invention, cupric oxide is coated upon the inner surface of transparent portions of the envelope wall, both where the cesium atoms are expected to impinge directly on the envelope and where these atoms are only randomly present. The successive color changes of the cupric oxide will then provide an indication of the remaining useful life of the atom beam tube.

Although the cesium-emitting material in FIG. 3 is directly heated by passing an electric current through the material, indirect heating of the emitting material could be utilized simply by providing a separate electrical heater in close thermal relationship with a body of the cesium-emitting material. This technique would be useful for example, where the cesium-emitting material was a poor conductor of electricity or otherwise unsuited for use in the directly heated filament arrangement of FIG. 3.

From the above explanation it will be seen that the particular emitter arrangement of FIG. 3 has numerous features which serve to greatly increase the shelf-life, service-life and practicality of the present system. The elimination of liquid sources avoids the possibility of spilling if the device is turned in space. The filament has an indefinite shelf-life at expected ambient temperatures of 100° C. or less, and can be designed to afford a sufficient supply of cesium to sustain operation for periods of several years of normal usage.

Referring again to FIG. 3, a beam director tube 32 is provided at one end of the enclosure 29. The tube 32 opens into the interior of the enclosure 29. The outer end of the tube 32 (the right end in FIG. 3) opens into the evacuated enclosure formed by the envelope of the atomic beam frequency reference tube. Atoms of cesium are ejected from the interior of the enclosure 29 by their thermal energies and the stream of atoms from the enclosure 29 is formed into a beam extending parallel to the direction of the tube 32. The velocity of the ejected atoms will be approximately that of sound in the vapor. This velocity is approximately 600 feet per second so that a fairly high velocity beam of atoms is projected outwardly from the cesium atom source 16.

The cesium atoms from the cesium atom source 16 are directed to a magnet 17. The magnet 17 has a longitudinal opening therethrough for the passage of the cesium atoms. The construction of the magnet 17 is generally similar to the construction of a detector magnet 19 located downstream of magnet 17, as described below.

Hereinafter the magnet 17 will be referred to as the separator magnet or A-magnet while the magnet 19 will be referred to as the detector-magnet or B-magnet. Although the magnets 17 and 19 could be placed within the evacuated envelope 28 it is preferred for reasons which will be further explained that they be placed outside of the envelope 28 of the atomic beam frequency reference tube.

The detector magnet 19 is shown in more detail in FIG. 4, and the following explanation of it is equally applicable to the separator magnet 17.

The magnet 19 comprises an annular cylinder 34 preferably of soft iron. The cylinder 34 is divided into two diametral parts to allow the magnet to be assembled around the cylindrical tube envelope 28, indicated as made of glass, although any non-magnetic material may be used. A plurality of magnets 35 and 36 are arranged on the inner surface of the annular cylinder 34 and outside the envelope 28. The magnets 35 and 36 are illustratively arranged in two pairs, and may be formed of any suitable permanently magneticable material such as Alnico V. The pair of magnets 35 is arranged on opposite inner surfaces of the cylinder 34, and are magnetized with a north pole along the portion of the magnet nearest the center of the cylinder 34. The south pole of each of these magnets is of course on the opposite surface of the magnet.

The pair of magnets 36 is also arranged on opposite inner surfaces of the cylinder 34, displaced 90° from the magnets 35. The magnets 36 are magnetized in the opposite fashion, that is, the south pole of each of the magnets 36 is located along the surface of the magnet which is nearest the center of the cylinder 34. The north pole of each of the magnets 36 is located on the opposite surface of the magnet.

Each of the magnets 36 is divided in two parts, along the same plane of division as that of the cylinder 34, so that the entire magnet assembly 19 may be fabricated in two separate parts and thus may be readily assembled around or dis-assembled from the envelope 28 of the atomic beam frequency reference tube. The magnetic lines of force of the magnet assembly 19 are indicated by dashed arrows in FIG. 4. It will be seen that the lines of force enter the interior of the tube envelope 28 in a symmetrical manner, where they are effective to influence the beam of cesium atoms which is indicated in dash lines at 37 in FIG. 4.

In FIG. 4 it should be noted that the magnetic lines of force produced within the magnet assembly 19 are such that at the exact axis of the magnet and of the tube envelope 28, the magneto-motive forces of the individual magnets 35 and 36 tend to cancel out, thus providing a magnetic field intensity substantially equal to zero at the axis of the tube envelope 28. The magnetic field intensity gradually increases as one moves radially outward from the center of the tube envelope 28, and the maximum field intensity existing within the envelope 28 is at the extreme outer edges.

The advantages of the particular form of deflecting magnets 17 and 19 can best be understood by comparison with previous atomic beam deflection systems in which the deflection of the atoms of the beam was uni-directional rather than radial as in the present case. A deflecting magnet 41 as utilized in the prior art is shown in FIG. 6. The magnet 41 includes a U-shaped frame 42 and two magnetized elements 43 and 44. A gap is formed between the elements 43 and 44, with one of the elements representing a north pole and the other element representing a south pole. Accordingly magnetic lines of flux indicated in dashed lines 45 in FIG. 6 flow from element 43 through the U-shaped frame 42, the magnetized element 44 and the air gap between the magnetized element 44 and 43 and thus back into the element 43.

The magnetized element 44 has a convex tip indicated at 46. On the other hand, the magnetized element 43 has a tip which has a concavity formed therein as indicated at 45. Therefore lines of force emanating from the element 44 diverge as they cross the air gap and enter the element 43. Thus the magnetic field across the gap between elements 43 and 44 is non-uniform being stronger near the element 44 and weaker near the element 43. It will be noted that the variation in field uniformity in the magnet 41 is uni-directional or linear so that a beam of atoms passing through the air gap of the magnet 41 will be deflected uni-directionally or in the case where the atoms are of two different precessional modes they will be deflected bi-directionally, one to the right and one to the left. A number of disadvantages are present in this type of system. A very significant disadvantage is that the path of the atom beam cannot be rectilinear, but must consist of a curved path or a series of straight line segments displaced at angles with one another. This obviously produces difficulty in the manufacture of the tube as compared with the superior construction provided by the present invention in which the beam path through the tube is linear from one end to the other.

Another disadvantage of the configuration shown in FIG. 6 results from the fact that the magnet 41 is not symmetrical. Therefore any scheme for dis-assembling the magnet 41 must necessarily require the interruption of the magnetic circuit for the magnetic lines of force of the magnet 41. The interruption of the magnetic path for the lines of force of a light powerful magnet such as the magnets for the atomic beam frequency reference tube results in a partial demagnetization of the magnets. Therefore when the magnet 41 is utilized in an atomic beam tube to avoid such demagnetization, the magnet must be arranged so that it is not dis-assembled, as by being an integral part of the tube, or, alternatively, there must be facilities provided for re-magnetizing the magnet after it is assembled on the atomic beam tube. Either one of these approaches is very unsatisfactory from a practical point of view.

In contrast with this situation, in applicant's apparatus a symmetrical type of magnet structure shown in FIG. 4 is utilized. This structure is provided in two symmetrical parts so that it may be separated along an axis of symmetry of the structure, without interrupting the path for the magnetic lines of force across the magnet air gap between various ones of the magnetic poles. Thus the magnet 19 can be dis-assembled and reassembled without causing any substantial demagnetization of the magnet. It follows from this that the magnet 19 can be supplied as a separate item and that it can be removed from one atomic beam tube and reassembled on a replacement tube without the necessity of remagnetization of the magnet. Since the tube itself has a finite life and requires replacing periodically, this feature of applicant's apparatus is an important advantage particularly where the apparatus is to be used for military or other field applications as distinguished from use purely as a laboratory instrument.

Having explained the general configuration and advantages of the similar magnets 17 and 19, the purpose and operation of the magnets in the tube will now be explained. The outer electron belonging to each cesium atom which is ejected from the source 16 spins rapidly on its axis and can be in one of two possible modes of precession. The electron may be visualized as executing a constant precessional motion similar to that of a gyroscope when its axis is inclined at a small angle to the gravitational field and the gyroscope is supported at one end of its axis. The two modes correspond respectively to the case where the electron spin direction is the same as that of the cesium nucleus which is also spinning, and to the case where the spin directions are opposed. The important fact about these complicated states or modes of electron motion is that a majority of atoms in one of these modes injected into a very non-uniform magnetic field will be attracted to regions of the magnetic field where the field strength is high. A majority of atoms in the other mode is attracted to regions of the magnetic field where the field is weak.

Considering now the action of the separator magnet 17 upon the cesium beam passing through the tube envelope 28, the beam of cesium atoms 37 which is directed through the separator magnet 17 contains atoms in both of the two possible modes of electron precession. For convenience these modes will be designated as the strong-field-seeking mode and the weak-field-seeking mode.

Atoms of the strong-field-seeking mode in passing through the separator magnet 17 will be deflected radially outward from the center of the beam. This is due to the fact that the magnetic field within the separator magnet 17 is such that it has a stronger intensity as one moves radially outward from the center of the beam, the intensity at the center of the beam being substantially zero. Therefore atoms of the strong-field-seeking mode will be deflected outward from the center of the beam 37 and will be caused to impinge upon the tube envelope 28 and accordingly will be removed from the atomic beam.

The atoms of the weak-field-seeking mode will be deflected inwardly toward the center of the tube envelope 28 in passing through the separator magnet 17. The length and field strength of the magnet 17 are adjusted to cause these atoms of the weak-field-seeking mode to be brought substantially parallel or to be focused substantially at the center of the microwave resonant cavity 18 which follows separator magnet 17 in position along the atomic beam. The separator magnet 17 thus operates to remove all cesium atoms of the strong-field-seeking mode from the atomic beam allowing the cesium atoms of the weak-field-seeking mode to pass into the resonant cavity 18.

It is within the resonant cavity 18 that the actual comparison of a radio-frequency electrical signal with the electron precessional frequency of the atom is made. Atoms of the weak-field-seeking precessional mode which are subjected to an oscillating field within the cavity 18 will be switched to the opposite strong-field-seeking precessional mode if the frequency of the oscillations of the field within the cavity is precisely the electron precessional frequency. The strength of the oscillating field may be adjusted so that exactly at resonance the greatest number of atoms will be switched. Oscillating fields of a frequency only a few cycles higher or lower than the electron precessional frequency have little or no effect in switching the electron precessional mode of the beam passing through the cavity. It is this phenomenon which makes it possible to obtain frequency standards with an accuracy of one part in one billion or better. The radio frequency energy input to the resonant cavity 18 is indicated at 20, and may be any one of many conventional types.

Figure 7A:
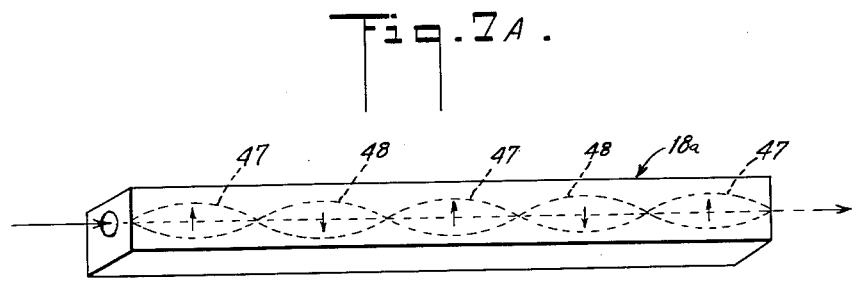
FIG. 7A is an isometric view of a microwave resonant cavity, partially schematic in form, and presented to show the standing wave configuration in such a cavity for explaining the operation of the preferred forms of resonant cavities shown in FIGS. 7B and 7C.
Figure 7B:
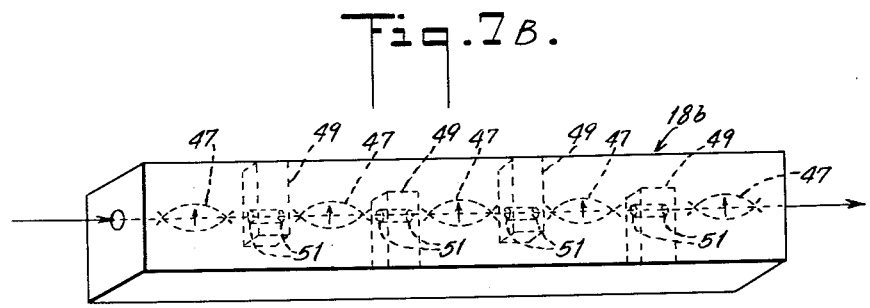
FIG. 7B is a partially schematic isometric view of a preferred form of resonant cavity for use in the atomic beam frequency reference tube of FIG. 2.
Figure 7C:
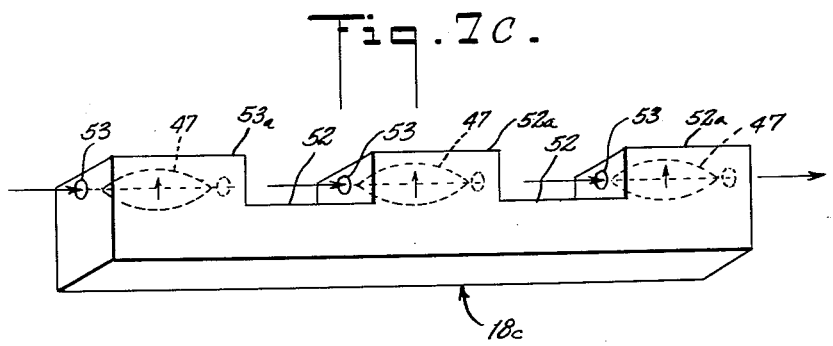
FIG. 7C is a partially schematic isometric view of an alternative form of resonant cavity for use in the atomic beam frequency reference tube of FIG. 2.

From the previous explanation of the operation of the microwave cavity 18 it will be appreciated that the beam of cesium atoms in the weak-field-seeking mode passing through the resonant cavity 18 will be substantially unchanged if the frequency of oscillation of the field within the cavity is not very close to the electron precessional frequency of the cesium atoms. On the other hand, as the frequency of oscillation of the field within the cavity 18 approaches the electron precessional frequency of the cesium atoms, a substantial number of atoms passing through the resonant cavity 18 will be converted from the weak-field-seeking mode to the strong-field-seeking mode, and when the frequency of oscillation of the field within the resonant cavity 18 is precisely the electron precessional frequency of the cesium atoms, the number of cesium atoms converted to the strong-field-seeking mode within the cavity 18 will be a maximum. A preferred form of resonant cavity 18$b$ for use in the atomic beam frequency reference tube is shown in FIG. 7B, and an alternative form of resonant cavity 18$c$ is shown in FIG. 7C. The operation of these improved forms of resonant cavity can best be understood by reference to FIG. 7A.

In order to provide efficient operation of the atomic beam frequency reference tube it is desirable to maintain each atom of the atomic beam within the influence of the resonant cavity 18 for as long a time period as possible. Since it is impractical to slow the beam of atoms, the increase of time of resonant cavity influence is accomplished by lengthening the beam path within the resonant cavity 18. This presents no difficulty if the wavelength of the radio energy is many times the desired cavity length. However, when this wavelength becomes smaller (at higher frequencies) than the cavity dimension, the cavity field breaks up into "standing waves." This phenomena is related to the situation in which a taut string is vibrating in an overtone mode such that one or more nodal or quiescent points occur along its length. Halfway between the nodal points are antinodes, where the string has maximum amplitude of vibration. On either side of the nodal points the motion of the string is exactly reversed; that is, when the string at one anti-node is moving up, at the next anti-node it is moving down. In other words, the adjacent anti-nodes are vibrating in opposite phase. The same condition occurs in the resonant cavity with the understanding that the standing waves of the oscillating field are analogous to the standing waves of the string motion. As the atom passes through the successive antinodal points in the cavity the standing waves have a mutually cancelling effect. Such a condition will result in cancellation and deterioration of the interaction between beam and field producing the resonance effect.

It has been proposed to overcome this difficulty to some extent by replacing the single long cavity with two very short cavities operating in phase coincidence and separated by a distance equal to the length of the original long cavity. The use of this technique has a serious disadvantage in that it gives rise to spurious responses in addition to the true resonance response. These spurious responses are very similar to the real resonance response, except that they occur for oscillating field frequencies near but not at the electron precessional resonances.

A skilled worker using an atomic beam frequency reference tube as a frequency reference apparatus would have no difficulty in distinguishing a true resonance from a spurious response. However, where an atomic beam frequency reference tube is to be utilized as part of a frequency standard it is necessary that the true resonant response as distinguished from any spurious responses be detected by an electronic circuit, and that a crystal controlled oscillator or other high-accuracy radio frequency generator be controlled to minimize any departure from the true resonance response. It is highly difficult to devise an electronic circuit which can reliably distinguish between the spurious response and the true resonant response in the two-cavity type of apparatus described above.

Accordingly in the present invention a different approach is made to the problem, as indicated in FIGS. 7B and 7C. In FIG. 7B a resonant cavity 18b is shown which is several wavelengths long. Standing waves having several anti-nodes are therefore generated within this cavity. As in the case of the cavity 18a, the field at half of the anti-nodes of FIG. 7B oscillates in opposite phase to that of the other half.

In the cavity 18b however, shielding structures 49 are provided (preferably formed of conductive material) which serve to shield certain sections of the atomic beam path from the influence of field portions having a particular phase of oscillation. Thus the only standing waves which are effective in influencing the atomic beam are the field portions 47, having the same phase. Apertures 51 are provided in the shielding structures 49 to allow passage of the atomic beam longitudinally through the resonant cavity. Therefore the resonant cavity 18b of FIG. 7B provides a particularly advantageous feature in the construction of an atomic beam frequency reference tube according to the present invention.

FIG. 7C shows an alternative type of resonant cavity 18c. The resonant cavity 18c has indented sections 52 and projection sections 52a provided with apertures 53 so that the beam of atoms passing through the cavity 18c along certain portions of its path passes outside the cavity and thus outside the influence of standing waves within the cavity. The resonant cavity 18c operates in generally the same manner as the previously explained cavity 18b in that the atomic beam is removed from the influence of alternate ones of the standing wave anti-nodes along the length of the path and the atoms of the beam are influenced only by field portions which are oscillating in phase with each other.

Since they may be made several wavelengths long and thereby increase the dwell time of cesium atoms within the cavity, the resonant cavities 18b and 18c previously described are particularly adapted to provide a high degree of sensitivity in detecting slight input frequency variations.

The cavity 18 in FIG. 2 responds to the resonance condition by converting the atoms of the beam from the weak-field-seeking mode to the strong-field-seeking mode. To produce an indication of resonance, it is thereafter necessary to detect the presence of these atoms of the latter mode and desirably to produce an electrical signal of usable form in response thereto.

For this purpose the detecting magnet 19 is placed in the beam path to receive the atoms passing through the resonant cavity 18. As previously explained the detector magnet 19 is similar to the separator magnet 17 and has a field strength varying as a function of the distance radially outward from the center of the magnet. More specifically the magnet 19 is constructed to have substantially zero field strength at the center and a gradually increasing field strength outwardly toward the periphery of the atomic beam reference tube envelope 28.

As was the case with separator magnet 17, the detector magnet 19 deflects atoms of the two different electron precessional modes in opposite directions. That is, atoms of the weak-field-seeking mode are deflected inwardly toward the axis of the electron beam while atoms of the strong-field-seeking mode are deflected outwardly away from the axis of the beam.

As previously pointed out it is desired to detect only those atoms of the strong-field-seeking mode since the presence of these atoms is an indication of mode-switching action in the resonant cavity and thus an indication of presence of a resonant frequency oscillation within the cavity. Accordingly an interceptor plate 21 may be placed in the center of the beam path and serves to collect all of the weak-field-seeking mode atoms, which are focussed thereon. These atoms are thus effectively removed from the stream and cannot influence the indicator apparatus.

At a further point along the beam path there is placed an ionizing ring 22. The ring 22 is preferably constructed of tungsten or platinum and is heated to incandescence in any suitable manner, such as by the passage of an electric current. Due to the phenomena of surface ionization, the beam of strong-field-seeking cesium atoms impinging upon the ionizing ring 22 will reflect from the ring as positively charged ions. These ions may be drawn through the center of the ring by an electrical field and detected in any suitable manner, one suitable manner being described hereinbelow. The intercept plate may be omitted and the atoms may be allowed to pass through without striking an ionized surface. There are so few of them that they do not make a significant deposit, and being un-ionized, they do not effect the ion detector.

It should be noted at this point that the present invention provides substantial advantage by the circular symmetry of the atomic beam and of the magnetic fields employed in the present apparatus. The circularly symmetrical arrangement allows the use of an ionizing ring rather than a rectangular plate for example. The use of such a shape alone improves the sensitivity of the apparatus by a factor of two or more. In addition, this configuration permits the area of impingement on the annular surface of the ionizing ring 22 to be increased by a factor of approximately 15 over previously known configurations thus further increasing the apparatus sensitivity.

Perhaps the greatest improvement in efficiency by the use of the circularly symmetric radially varying magnetic field is caused by the focusing effect of such a field. By the use of a circularly symmetric radially varying field, the narrow diverging beam of atoms from the emitter can be brought to a focus (or to parallelism in the limiting case), at least as regards the desired precession mode. Thus all atoms (of the desired mode) which enter the deflecting magnet gap can be made to ultimately strike the detector. Where the horse-shoe type magnet, illustrated in FIG. 6 for example, is utilized no focusing action takes place but rather the deflection is analogous to the refraction of a beam of light passing through a prism. That is, the direction of the rays are changed equally and any divergence that is present is unaltered by passing through the prism.

The improved efficiency resulting from the focusing effect can be appreciated by a consideration of the factors involved in the two cases. In the case where a horse-shoe type magnet such as shown in FIG. 6 is involved, the effective solid angle which intercepted by the ionizer is approximately proportional to the ionizer area divided by the square of the emitter to ionizer distance. It will be noted that the emitter and ionizer are separated by virtually the entire length of the atomic beam tube. On the other hand, where a magnetic field having radial variation is utilized to produce a focusing effect, all atoms which enter the deflecting magnet gap can be made to ultimately strike the detector. Therefore, the effective solid angle of intercept may be measured by the solid angle subtended at the emitter orifice by the first magnet gap; this is in turn equal to the magnet gap area divided by the square of emitter-magnet spacing.

The emitter to first magnet spacing may be much less than the emitter to ionizer distance which is the critical factor in the first case. From the above explanation it may be seen that the effective solid angle of ionizer intercept may be much greater in the case of the magnetic field with radial variation and may amount to as much as a factor of 1000 greater. It may readily be seen therefore that the focusing effect of the radially varying magnet together with the other advantages described above provides a great improvement over previous uni-directional deflection systems.

Although the ionizing ring 22 effectively converts the uncharged atoms of cesium to charged particles which can be electrically manipulated and detected, it also produces an undesired side effect. Impurities existing in the ionizing ring 22 (such as potassium) are evaporated as charged particles and join the stream of cesium atoms deflected through the center of the ionizing ring 22. If these atoms of elements other than cesium were not eliminated they would represent a type of background noise and thereby reduce the sensitivity of the system.

In the present device, apparatus is incorporated for eliminating the atoms of elements other than cesium. This apparatus is in the nature of a time-of-flight mass spectrometer. Apparatus of this type is well known in the multiplier indicated at 27. In the electron multiplier 27 they initiate the well known avalanche process resulting in an amplified current at the multiplier output which is in proportion to the flux of neutral cesium particles onto the ionizing ring 22. The signal which appears at the output (anode) of the electron multiplier 27 thus forms the error signal input for the servo frequency control 15 shown in FIG. 1. The detailed construction of the electron multiplier 27 is not shown as it is a conventional element whose construction is well known in the art.

It should be appreciated that the particular arrangement shown in FIG. 2 for detecting the cesium ions from the ionizing ring 22 may be replaced by other types of detection apparatus, and in fact the ionizing ring 22 also could be replaced by other detection apparatus.

Alternative detection apparatus is shown by way of example in FIG. 5. In FIG. 5 cesium ions passing through the mass spectrometer grids 23, 24, 25 and 26 are directed to a phosphor target 38. Each cesium atom impinging upon the phosphor target 38 will create a spark of luminescence. A photo-multiplier tube 39 is provided which detects the luminescence of the phosphor target 38 and provides an amplified electrical signal corresponding to the number of cesium ions passing through the mass spectrometer. It will thus be seen that the operation of the apparatus of FIG. 5 produces a result substantially the same as that of the mass spectrometer and electron multiplier of FIG. 2.

Thus far only the atomic beam frequency reference tube apparatus forming a part of the frequency standard has been described. It is the function of the atomic beam frequency reference apparatus to provide an indication of the difference between a radio frequency signal supplied to the resonant cavity of the reference tube and the electron precession frequency of the cesium atoms. An error signal indicative of this difference is obtained from the atomic beam frequency reference in the form of an electrical signal which is a maximum for zero error and decreases for increasing amounts of error in either direction from the exact electron precession frequency. The characteristic curve of ion detector output (error signal) versus input radio frequency signal is shown in FIG. 12, and is the well known resonance curve. The apparatus required to complete the frequency standard comprises a radio frequency source (which may be in the form of a crystal oscillator with a frequency multiplier and synthesizer circuit) and a servo frequency control for correcting the output frequency of the source in response to the error signal from the atomic reference and other associated apparatus. This apparatus is shown in FIGS. 8 through 11.

Figure 8:
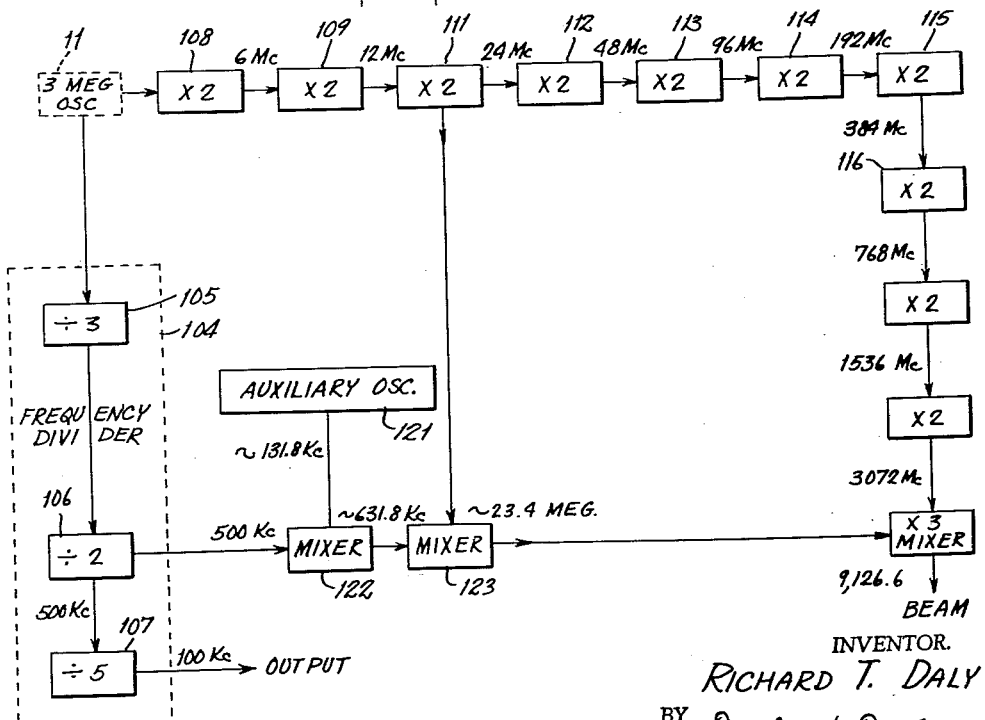
FIG. 8 is a schematic block diagram of a frequency synthesizer for use in the atomic beam frequency standard of FIG. 1.

FIG. 8 shows a frequency multiplier and synthesizer apparatus for use in the frequency standard. As previously explained, it is usually not convenient to provide an oscillator which is exactly equal to the resonant frequency of the atomic beam frequency reference tube. The electron precession frequency of cesium, for example, is approximately 9192.631830 megacycles per second. It would be generally impractical at the present state of the art to attempt to provide a stable oscillator directly producing an approximation to this odd value frequency, because for greatest utility, other values of stabilized output frequency would generally be desired. Accordingly, an oscillator (preferably of crystal type) is utilized which produces a frequency substantially lower than the atomic beam resonant frequency and which is a "round number" rather than the complicated number represented by the atomic beam resonant frequency. A frequency multiplier and synthesizer circuit is then utilized to convert this lower "round number" frequency of the crystal oscillator to substantially the exact resonant frequency of the atomic beam tube.

In the device shown in FIG. 8 it is assumed for the purpose of illustration that the crystal oscillator 11 has a nominal frequency of 3 megacycles. It is therefore the function of the frequency multiplier and synthesizer 13 to convert this frequency of 3 megacycles by multiplication, heterodyning, and the like to a frequency of 9192.631830 megacycles per second.

A frequency approximating that of the atomic beam tube resonant frequency can be achieved by successive frequency multiplications. Specifically, a frequency of 9216 megacycles per second can be achieved by multiplying 3 megacycles by a factor of $3 \times 2^{10}$. This approach is utilized in the apparatus of FIG. 8 wherein 10 successive frequency doublers and a frequency tripler are utilized to produce the frequency of 9192 megacycles per second. The frequency doublers are indicated in FIG. 8 by blocks 108 through 118 and the frequency tripler is indicated at 119. These circuits are of conventional design and need not be described further here. The frequency tripler 119 is also utilized as a mixer as will be explained hereinafter.

It will be observed that the frequency of 9216 megacycles exceeds the true resonant frequency of the atomic beam tube by a particular frequency difference, which for convenience will be described as approximately 23.4 megacycles per second. In the apparatus of FIG. 8 the difference between the frequency of 9216 megacycles per second acquired by direct multiplication and the exact resonant frequency is synthesized and subtracted from the frequency derived by multiplication in the multiplier mixer 119. This required difference frequency is synthesized as follows.

A frequency divider 104 is utilized to divide the three megacycle per second output of the crystal to a desired output frequency which in the present case is 100 kilocycles. This is accomplished by dividing the frequency of 3 megacycles per second by three in the frequency divider 105, and thereafter dividing the frequency by two in the frequency divider 106. The output of the frequency divider 106 is therefore 500 kilocycles. A still further frequency divider 107 is utilized for dividing the frequency of 500 kilocycles by five to obtain the desired 100 kilocycle output for the frequency standard.

A second output of 500 kilocycles from the frequency divider 106 is utilized in the synthesis of the difference frequency required to bring the frequency of 9216 megacycles down to the exact resonant frequency of the atomic beam tube.

The 500 kilocycle signal is added to a signal from an auxiliary oscillator 121 (preferably also a crystal oscillator) in a mixer 122. The frequency of the auxiliary oscillator, indicated as approximately 131.8 kilocycles, will actually be substantially 131,830 cycles per second. As will be seen this is the frequency which is required to eventually produce the exact resonant frequency of the atomic beam frequency reference tube. The approximately 631.8 kilocycle output from the mixer 122, which is equal to the sum of the auxiliary crystal frequency of 131,830 cycles per second and the frequency output of 500 kilocycles per second from the frequency divider 106, is fed to a further mixer 123. The mixer 123 is also supplied with a 24 megacycle per second frequency from the frequency multiplier 111, and produces an output signal which is equal to the difference between its two input frequencies. The output of the mixer 123 is therefore 23.368170 megacycles per second. This output is supplied to an input of the multiplier mixer 119. In the multiplier mixer 119 an output frequency is produced equal to 3 times the input frequency of 3072 megacycles per second minus the input frequency of 23.368170 megacycles per second, to arrive at a final frequency of 9192.631830 megacycles per second, which is the resonant frequency of the atomic beam frequency reference tube.

The multiplier mixer 119 is a crystal diode frequency multiplier and mixer, the design and operation of which is well known in the art. Briefly, the crystal diode multiplier and mixer has a square law output characteristic so that when supplied with two different input frequencies, a plurality of output frequencies are produced including various combinations of sums and differences of the input frequencies and their multiples. Of the various output frequencies produced by the multiplier mixer 119, the particular frequency corresponding to three times the input frequency of 3072 megacycles minus the second input frequency of 23.368170 megacycles per second is selected by a filter or other suitable device. Obviously, a separate multiplier and a separate mixer apparatus could also be used to produce the same result.

It will be understood that the various mixers and frequency multipliers may include filters for the selection of the desired frequency and that other known techniques may be utilized in the construction of the frequency multiplier and synthesizer shown in FIG. 8. It should furthermore be understood that in some instances several of the frequency doublers can be replaced by one or more different frequency multipliers producing the same multiplication factor and that other changes in the construction of the frequency multipliers may be made in accordance with known practice in the art.

A particularly advantageous feature of the frequency multiplier and synthesizer 13 shown in FIG. 8 resides in its simplicity and the relatively small number of elements utilized to synthesize a very complicated number to an accuracy of nine significant figures. This simplicity is made possible largely by the use of the auxiliary oscillator 121 in synthesizing the desired frequency. Except for the use of the auxiliary oscillator 121 it would be necessary to further divide a three megacycle crystal frequency to provide still lower sub-multiple frequencies extending down to frequencies of less than 100 cycles per second. In addition, further mixers would have to be provided for combining various ones of these low sub-multiple frequencies to achieve the desired atomic beam tube resonance frequency. The increased number of elements required for such an approach would greatly increase the cost and complexity and reduce the reliability of the apparatus.

The auxiliary oscillator 121, however, effectively replaces many further additional elements and provides adequate accuracy for the frequency synthesis. It is recognized that the frequency of the auxiliary oscillator is not corrected in any way by the servo frequency control circuit and accordingly errors in the frequency of the auxiliary oscillator represent a source of error in the overall frequency synthesis. However, since the frequency (approximately 100 kilocycles) of the auxiliary crystal 121 is very low compared to the output frequency of the frequency multiplier and synthesizer being about $1/100,000$ of the atomic resonance frequency, an error in the frequency of the auxiliary oscillator is reduced by a factor of about 100,000 when compared with the frequency of the frequency multiplier and synthesizer output.

Since oscillators with an accuracy of one part in 100,000 are readily obtainable, oscillator 121 offers no serious limitation on accuracy of the system. Thus the arrangement shown in FIG. 8 provides a greatly simplified frequency multiplier and synthesizer apparatus without unduly sacrificing any accuracy of the overall frequency standard apparatus.

Figure 9:
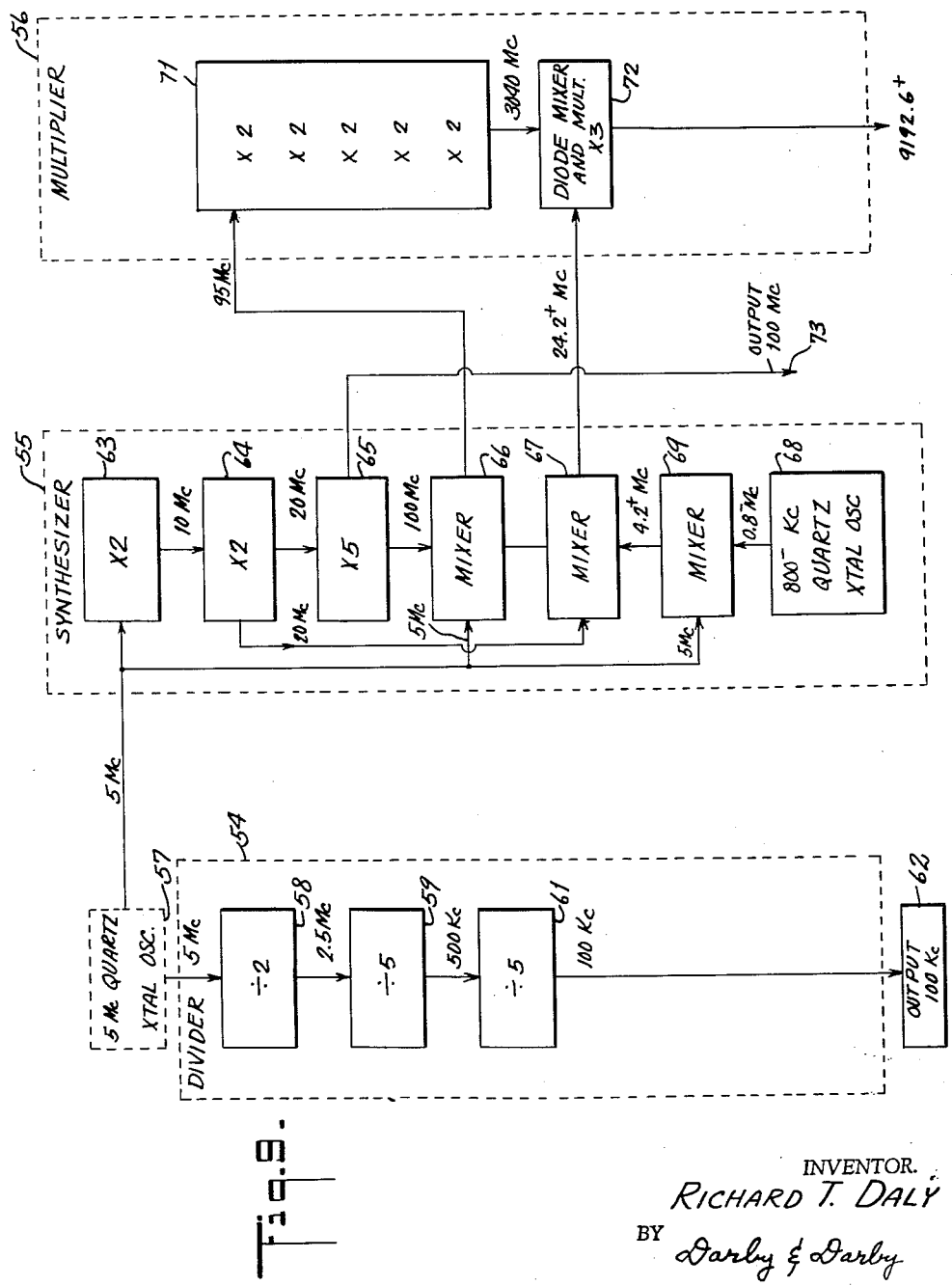
FIG. 9 is a schematic block diagram of an alternative form of frequency synthesizer and multiplier for use in the atomic beam frequency standard of FIG. 1.

An alternative form of frequency synthesizer and multiplier is shown in FIG. 9. The frequency multiplier and synthesizer of FIG. 9 is adapted for use with a 5 megacycle controlled oscillator 57, also preferably a crystal oscillator. The 5 megacycle per second signal from the oscillator 57 is supplied to a synthesizer 55 where the signal frequency is doubled and redoubled by frequency doublers 63 and 64 to provide an output of 20 megacycles per second. The 20 megacycle per second signal is multiplied by a factor of five in the frequency multiplier 65 and the resulting 100 megacycle output from the frequency multiplier 65 is fed to the input of a mixer 66. Also fed to the mixer 66 is a 5 megacycle per second input signal from the oscillator 57, to produce a 95 megacycle per second output signal from the mixer 66.

The 95 megacycle output of the mixer 66 is supplied to a multiplier indicated at 56 and is multiplied in a frequency multiplier chain indicated at 71 by a factor of 32 to a value of 3040 megacycle. The frequency multiplier chain 71 may, for example, consist of 5 frequency doublers connected in cascade. The 3,040 megacycle per second output signal from the multiplier 71 is supplied to a diode modulator 72, which is preferably a balanced crystal diode modulator and multiplier, and operates to produce an output signal equal to 3 times the sum of an input signal of 24.2+ megacycles per second and the input signal of 3,040 megacycles per second from the multiplier 71, to yield the exact desired output signal of 9192.631830 megacycles per second. The operation of the diode modulator 72 is well known in the art and is similar to that of multiplier-mixer 119 in FIG. 8 described briefly heretofore.

The 24.2+ megacycle per second signal which is supplied to the diode modulator 72 is synthesized in the synthesizer 55 in the following manner. A 5 megacycle per second signal is fed from the oscillator 57 to a mixer 69. An oscillator 68, preferably also of the crystal type, is provided which generates a signal of somewhat less than 800 kilocycles (more precisely, 789.390 kilocycles). This signal is also supplied to mixer 69 where the two input signals are mixed to provide a signal of 4.2+ megacycles per second. The 4.2+ megacycle per second output signal of the mixer 69 is combined with a 20 megacycle per second signal supplied from frequency doubler 64 in a still further mixer 67. A frequency of 24.2+ megacycles per second is thereby provided from the mixer 67 to be supplied to the diode modulator 72 to provide the ultimate frequency which it is desired to synthesize.

From the foregoing description of the frequency multiplier and synthesizer of FIG. 9 it will be seen that this apparatus operates in the same general manner as the previously described apparatus of FIG. 8. However, the apparatus of FIG. 9 is somewhat more complicated and utilizes an oscillator 68 of a somewhat higher frequency than the oscillator 121 of FIG. 8 and accordingly the frequency multiplier and synthesizer of FIG. 9 does not have quite as high an error reduction factor in the oscillator 68 as does the apparatus of FIG. 8 for the oscillator 121. It will of course be appreciated that other frequency multiplier and synthesizer schemes could be devised for use with the atomic beam frequency standard apparatus according to the present invention.

In the apparatus of FIG. 9, the 5 megacycle signal from the oscillator 57 is divided by successive frequency dividers 58, 59 and 61 to produce an output signal of 100 kilocycles per second at the output 62. A further output of 100 megacycles per second is provided from the frequency multiplier 65 and is produced at an output 73. It will be obvious that any desired discrete frequency output can be obtained by suitable multiplying and heterodyning of these output frequencies or other frequencies available within the system.

Figure 10:
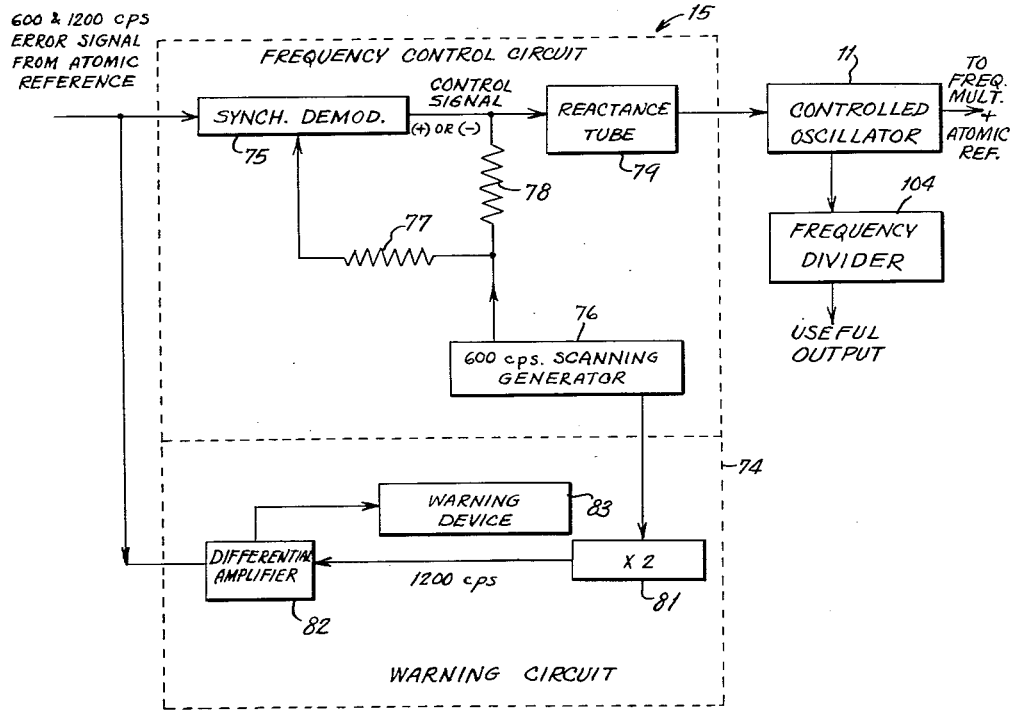
FIG. 10 is a schematic block diagram of a servo frequency control for the atomic beam frequency standard of FIG. 1.
Figure 11:
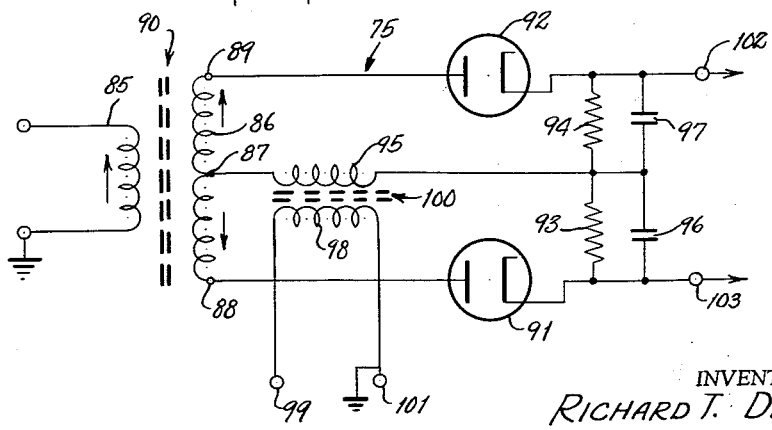
FIG. 11 is a schematic circuit diagram of a synchronous demodulator circuit suitable for use in the servo frequency control circuit of FIG. 10.

Apparatus has thus far been described which operates to generate a signal having a frequency approximately that of the electron precessional frequency of cesium and to compare this generated frequency with the electron precessional frequency and to ascertain any difference therebetween. The servo frequency control shown in block form at 15 in FIG. 1 operates to correct the generated frequency so that it is made equal to the electron precession frequency within an accuracy of one part in one billion. This apparatus is shown in FIGS. 10 and 11 and will be described with reference to those figures and with reference to FIG. 12 which shows a graph of certain relationships of frequency and atomic reference output signal which are useful in explaining the operation of the servo frequency control apparatus 15.

The frequency control circuit 15 includes a 600 per cycle per second signal generator 76 forming a scanning generator which generates an output signal used to frequency modulate the controlled oscillator 11 (which is oscillator 57 or 121 of FIGS. 9 and 8) in a manner which will hereinafter be described. Any suitable audio frequency signal generator apparatus is suitable for the scanning generator 76, as there is no stringent requirement for frequency accuracy or for amplitude control for the output signal from this generator.

The 600 cycle per second signal from the scanning generator 76 is fed through an input resistor 78 to a reactance tube 79. The reactance tube 79 or other suitable variable reactance element is coupled to the oscillator 11 to control the frequency of the oscillator 11 over a relatively narrow range of frequency. The scanning generator 76 and the reactance tube 79 thus operate to frequency modulate the output from oscillator 11 at a rate of 600 cycles per second. The frequency excursion or swing of this frequency modulation is preferably small compared with the oscillator frequency and may be such that it produces, after multiplication, an excursion on the order of 600 cycles per second at the cesium resonance frequency.

The output of the controlled oscillator 11 is fed through one of the frequency multiplier and synthesizer circuits described above, to the resonant cavity 19 of the atomic beam frequency reference tube 14, as indicated in FIG. 1.

Although the frequency modulation of the oscillator 11 produces side band frequencies other than the oscillator carrier frequency, the amplitude of these side band frequencies is negligible for the modulation frequency and swing which is utilized in the present apparatus. Should this modulation be undesired, then instead of directly frequency modulating the controlled oscillator, its output can be modulated in a separate modulator circuit. Then the modulated output supplies the synthesizer circuit or one of the frequency multiplier stages to excite the cavity, while the output can be derived from the unmodulated oscillator.

As a consequence of the frequency modulation of the oscillator 11, the frequency of the signal in resonant cavity 18 in the atomic reference 14 will also be frequency modulated at the same 600 cycle rate. The effect of this may be understood by reference to FIG. 12.

FIG. 12 shows a resonance curve EFGHI which generally corresponds to the relationship between the output of the electron multiplier 27 utilized as a cesium ion detector and the frequency of oscillation of the resonant cavity 18 in FIG. 2. As has already been indicated, the beam tube output is maximum at G when the excitation of cavity 18 has a frequency $F_{R1}$ and the output diminishes sharply as the frequency departs from $F_R$.

If it be assumed that the frequency of oscillation of the resonant cavity 18 is being swung over the range from A to B in FIG. 12, this will result in a substantially sinusoidal output signal from the beam tube 14, which varies from point J to point K in FIG. 12. The frequency of the beam tube 14 output will be equal to the modulating frequency of the resonant cavity oscillation, and by a suitable sense of connection, that the input to the servo frequency control circuit 15 may be arranged so that the error signal is in phase with the 600 cycle per second signal from scanning generator 76.

If now that the frequency modulated signal applied to the resonant cavity 18 is shifted in frequency to the point where it has a frequency swing between points C and D in FIG. 12. An error signal of 600 cycles per second will still be produced from the atomic reference 14, but in this second case the phase of the error signal with respect to the 600 cycle per second scanning generator signal will be shifted by 180° or in other words the error signal will be exactly out of phase with the signal from the 600 cycle per second scanning generator 76. The direction or sense of the error of the frequency of the signal applied to the resonant cavity 18 with respect to the resonant frequency of the atomic reference apparatus 14 will thus be indicated by the phase of the error signal supplied to the servo frequency control circuit 15. The phase of the error signal supplied to the frequency control circuit 15 is detected by any suitable phase-sense detector, such as a synchronous demodulator 75, which produces an output signal which is either positive or negative depending upon the phase of the error signal input to the synchronous demodulator 75 compared to the 600 cycle per second signal from the scanning generator 76 which is also supplied to the synchronous demodulator 75 through an input resistor 77.

It should be noted at this point that, as the center or carrier frequency of the modulated oscillation in the cavity resonator 18 approaches the resonant frequency of the atomic reference tube, the 600 cycle per second error signal from the beam tube 14 begins to diminish in amplitude and a 1200 cycle per second error signal is produced which is due to operation at or near the top of the resonance curve at point G in FIG. 12. When the carrier frequency is exactly at the resonant frequency of the atomic reference 14 the frequency of oscillation of the cavity 18 will swing back and forth between points B and C in FIG. 12. For each complete cycle of the resonant cavity frequency from B to C and back to B there will be produced two complete oscillations of the beam tube output, from K to L and back to K. At resonance therefore the output of the beam tube 14 will consist of a 1200 cycle per second signal and will not have any substantial 600 cycle per second component whatsoever, producing zero output from circuit 75. As the resonant cavity frequency departs from the resonance frequency $F_R$ of the atomic reference 14, a 600 cycle per second signal will appear at the output of the beam tube which will have a phase corresponding to the direction of the frequency error.

The phase detector 75 therefore produces a positive signal output when the cavity excitation departs from the beam tube resonant frequency $F_R$ in one sense, and a negative output signal for the opposite sense of departure, with a zero output when the excitation is exactly at resonance. Moreover, the output signal will have an amplitude corresponding to the amount of frequency departure or error. This output signal is used as a control signal and is supplied to reactance tube 79 to adjust the output frequency of controlled oscillator 11 in a direction tending to restore its resonance. It will therefore be seen that frequency control circuit 15 operates to continuously minimize the difference between the resonant cavity carrier frequency and the resonant frequency of the atomic beam frequency reference tube.

A synchronous demodulator circuit is shown in FIG. 11 which is suitable for use in the servo frequency control circuit 15. The error signal from the atomic beam reference tube is supplied to the primary 85 of a transformer 90 which is provided with a secondary 86 having terminals 88 and 89 and a center tap 87. A circuit is provided from the terminal 89 through a rectifier 92 and a resistor 94 back through the secondary 95 of a second transformer 100 to the center tap 87 of transformer 90. A similar circuit is provided from terminal 88 to a rectifier 91, a resistor 93 and secondary 95 of transformer 100 to the center tap 87 of transformer 90. Resistors 93 and 94 may be bypassed by filter condensers 96 and 97. The input from scanning generator 76 is supplied to terminals 99 and 101 of the primary 98 of transformer 100. The output of the synchronous demodulator 75 is taken from terminals 102 and 103 connected respectively to the cathodes of rectifiers 92 and 91. Such a synchronous demodulator is conventional, and its operation need not be described in detail. Obviously, any equivalent phase-sense detector may be substituted for demodulator 75.

As indicated in FIG. 10 the direct current signal from the synchronous demodulator 75 is applied to the reactance tube 79 and produces a change of the controlled oscillator carrier frequency which tends to drive the 600 cycle output of the atomic reference tube to a null condition where the radio frequency signal applied to the resonant cavity 18 is exactly that of the resonant frequency of the atomic beam frequency reference tube. It is obvious that when the frequency synthesized by the frequency multiplier and synthesizer circuit is exactly the resonant frequency of the atomic beam frequency reference tube, it must necessarily follow that the controlled oscillator is at its desired nominal carrier frequency and consequently the useful output is also of a frequency exactly equal to its desired frequency. The term exactly should be construed to mean within the prescribed limits of accuracy of the system, namely, one part in one billion or better.

In the present apparatus a signal will be produced from the controlled oscillator 11 even though the atomic beam frequency reference tube 14 or the servo frequency control circuit 15 is not operating properly due to component failure or for any other reason. Obviously if the atomic reference tube 14 or the servo frequency control 15 is inoperative, the controlled oscillator 11 will not be continuously corrected and thus may drift to a substantial error on the order of several thousand times the acceptable system error. The present apparatus includes a provision for indicating any lack of correspondence between the frequency applied to the resonant cavity 19 and the electron precession frequency. This warning circuit is shown at 74 in FIG. 10.

As previously explained, when the frequency of excitation of the resonant cavity substantially coincides with the atomic beam frequency reference tube resonant frequency, the error signal from the atomic beam frequency reference tube contains a large 1200 cycle per second component due to operation at the peak G of the resonance curve shown in FIG. 12. The presence of this 1200 cycle per second signal is utilized to indicate proper operation in the warning circuit 74. The error signal from the atomic reference 14 is supplied to a differential amplifier 82 which is also supplied with a 1200 cycle per second signal derived from the 600 cycle per second scanning generator 76 through a frequency doubler 81. If necessary a phase shift device may be incorporated in one or the other of the inputs to the differential amplifier 82 to assure that the two 1200 cycle per second inputs are in phase. So long as both inputs to the differential amplifier 82 are present the two signals are arranged to have amplitudes which substantially cancel out, producing little or no output from the differential amplifier 82.

If, however, the 1200 cycle per second component of the atomic reference error signal should substantially diminish or disappear, substantial output would be produced from the differential amplifier 82 due to the 1200 cycle per second input signal from the frequency multiplier 81. The output of the differential amplifier 82 is fed to a suitable warning device 83 to indicate that the apparatus may not be producing the desired output frequency within the prescribed limits of accuracy. Obviously, any type of indicator device could be used for the device 83, including audible, visible, recording or other indicators.

The warning circuit 74 serves another purpose in addition to warning of apparatus failure in that it provides an indication when the apparatus is first put into operation until the controlled oscillator is "locked on" the atomic beam reference tube resonant frequency.

It may be noted that no apparatus is provided to assure that the controlled oscillator 11 will produce a frequency when first put into operation that will traverse the reference frequency at a sufficiently slow rate so that the resonant frequency of the atomic reference 14 will be effectively "captured" by the servo frequency control system 15 thus "locking" the controlled oscillator 11 at the proper frequency. Such operation of the oscillator 11 may be assured by designing the final frequency of the oscillator, when warmed up, to be slightly different from the correct value in the direction of oscillator warm up drift. Thus in warming up the oscillator will drift through the correct value, causing the cavity excitation frequency to drift through the beam tube resonance frequency. Thus the "locked on" condition of the apparatus will be acquired.

In special circumstances where the above means for acquiring the reference tube resonance may not be sufficiently reliable, a low frequency manual or automatic sweeping of the oscillator frequency could be introduced to lock on the atomic reference resonance in accordance with well known practice in the art.

From the foregoing description it will be seen that a frequency standard is provided which has a very high degree of accuracy. The apparatus has numerous advantages over previously known frequency standards of comparable accuracy and is particularly superior in that it is well adapted to applications where it must be used in the field rather than in the laboratory.

The apparatus is also of simpler construction in that it utilizes a straight line symmetrical configuration and thus is better adapted to volume production due to the relative ease with which a straight envelope can be produced compared to the difficulty of producing an envelope having a predetermined curve or off-set configuration.

It should be appreciated that many modifications to the particular apparatus shown might be devised by a person of ordinary skill in the art and that the scope of the invention is not to be construed to be limited to the particular embodiments shown but is to include all such modifications and variations within the scope of the appended claims.

What is claimed is:

1. An atomic beam frequency reference tube comprising a source of atoms of a selected element, means directing said atoms in a beam along a predetermined rectilinear path, means for producing a first magnetic field having an intensity increasing continuously from the axis of said atom beam radially outwardly toward the periphery of said beam, the last said means extending a substantial distance along the path of said beam, a resonant cavity placed along the path of said beam and having means for ingress and egress of said beam, said means for ingress being located to cause atoms of a selected electron precessional mode to be directed into said cavity by the first magnetic field, atoms of the opposite mode being caused to diverge and be removed from said beam by said first magnetic field, said resonant cavity being resonant at substantially the reference frequency, means for supplying to said cavity a radio frequency signal to be compared with said atomic beam reference frequency, said radio frequency signal being of an amplitude sufficient to cause a shift of atoms from the selected mode to the opposite mode, further means placed along said beam following said cavity for producing a second magnetic field having an intensity increasing continuously from the center of the atom beam radially outward toward the periphery of said beam, the last said means extending a substantial distance along the path of said beam, and annular conversion means placed in the path of the beam for producing a flow of charged particles in response to impingement of atoms on said conversion means, said conversion means comprising a metal ring coaxial with said beam and means for heating said ring to incandescence, the said second magnetic field being placed to cause said opposite mode atoms to be deflected to strike said conversion means to produce a flow of charged particles indicative of the degree of correspondence of the resonant cavity excitation frequency with the atomic beam reference frequency.

2. An atomic beam frequency reference comprising a source of atoms of a selected element, means for directing said atoms in a beam along a predetermined path, means along said path for producing a first magnetic field having an intensity varying continuously and monotonically from the axis of said atom beam path radially outward toward the periphery of said beam, the last said means extending a substantial distance along the path of said beam, a resonant cavity placed along and extending around the path of said beam and having means for ingress and egress of said beam, said means for ingress being located to cause atoms of a selected electron precessional mode to be directed into said cavity by the first magnetic field, atoms of the opposite mode being caused to diverge and be removed from said beam by said first magnetic field, said resonant cavity being resonant at substantially the reference frequency, means for supplying to said cavity a radio frequency signal to be compared with said atomic beam reference frequency, said radio frequency signal being of an amplitude sufficient to cause a shift of atoms from the selected mode to the opposite mode, further means placed along said beam path following said cavity for producing a second magnetic field having an intensity varying continuously from the axis of the atom beam radially outward toward the periphery of said beam, the last said means extending a substantial distance along the path of said beam, and annular conversion means placed in the path of the beam from the last said means for producing a flow of charged particles in response to impingement of atoms from said means on said conversion means, the said second magnetic field being placed to cause said opposite mode atoms to be deflected to strike said conversion means produce a flow of charged particles indicative of the degree of correspondence of the resonant cavity excitation frequency with the atomic beam reference frequency.

3. An atomic beam frequency reference comprising a source of atoms of a selected element having a predetermined electron precessional reference frequency, means for directing said atoms in an uncharged beam along a predetermined path, means along the path of said beam for producing a first magnetic field having an intensity varying continuously from the axis of said atom beam radially outwardly toward the periphery of said beam, a resonant cavity placed along the path of said beam and having means for interaction of its field with atoms of said beam, said first magnetic field being located to cause atoms of a selected electron precessional mode to be directed into interaction with said cavity field and to cause atoms of the opposite mode to diverge and be removed from said beam, means for supplying to said cavity a radio frequency signal to be compared with said atomic beam reference frequency, further means placed along said beam path following said cavity for producing a magnetic field having an intensity varying continuously from the center of the atom beam radially outward toward the periphery of said beam, and conversion means placed in the path of the beam from the last said means for producing a flow of charged particles in response to impingement of atoms on said conversion means.

4. An atomic beam frequency reference comprising means for projecting along a predetermined rectilinear path a beam of atoms of a selected chemical element having a predetermined electron precessional frequency forming a reference frequency, said atom also being in either of two electron precessional modes, means along said path for radially diverting from said beam substantially all atoms of one of said two modes, means along said path for subjecting the remaining atoms of said beam to a field of a frequency to be compared with said reference frequency, said field being of sufficient amplitude that if said field is of a frequency substantially equal to said reference frequency said atoms are caused to revert to said one mode by interaction with said field, and means along said path responsive to said latter atoms of said one mode for producing a signal indicative of the relationship between said reference and field frequencies.

5. A radio frequency resonant cavity for an atomic beam frequency reference apparatus comprising an enclosure of conductive material having means for ingress and egress of an atom beam, said cavity having a length along said beam equal to at least three half-wave lengths at the reference frequency and means for introducing radio frequency energy into said cavity to maintain a standing field with half-waves oriented in a first sense and further standing half-waves oriented in an opposite sense, said cavity further having means for shielding said beam from the field of said standing half-waves oriented in said opposite sense, whereby atoms of a particular electron precessional mode are caused to be shifted by the field within said cavity to the opposite precessional mode with substantially no cancellation of shifting effect due to oppositely oriented fields in said resonant cavity.

6. A radio frequency-resonant cavity for an atomic beam frequency reference apparatus comprising an enclosure of conductive material having means for ingress and egress of an atom beam, said cavity having a length along said beam equal to at least three half-wave lengths at the reference frequency and being adapted to maintain a standing wave field with half-waves oriented in a first sense and further standing half-waves oriented in an opposite sense, said cavity further having means for shielding said beam from the field of said standing half-waves oriented in said opposite sense, said means for shielding said beam comprising a structure within said enclosure shielding a portion of said enclosure from radio frequency energy, said structure having apertures therein for the passage of an atom beam therethrough, whereby atoms of a particular electron precessional mode are caused to be shifted by the field within said cavity to the opposite precessional mode with substantially no cancellation of shifting effect due to oppositely oriented fields in said resonant cavity.

7. A radio frequency resonant cavity for an atomic beam frequency reference apparatus comprising an enclosure of conductive material having means for ingress and egress of an atom beam, said cavity having a length along said beam equal to at least three half-wave lengths at the reference frequency and being adapted to maintain standing half-waves having a field oriented in a first sense and further standing half-waves oriented in an opposite sense, said cavity further having means for shielding said beam from the field of said standing half-waves oriented in said opposite sense, said means for shielding said beam comprising indentations in the outline of said cavity, and apertures in the walls of said enclosure adjacent said indentations to allow said beam to pass outside and to re-enter said enclosure, whereby atoms of a particular electron precessional mode are caused to be shifted by the field within said cavity to the opposite precessional mode with substantially no cancellation of shifting effect due to oppositely oriented fields in said resonant cavity.

8. Apparatus as claimed in claim 4 wherein said means responsive to said atoms of said one mode comprises means for deflecting radially outward said atoms of said one mode, a ring placed following said deflecting means along the path of said beam and substantially coaxial therewith, means for heating said ring to cause ionization of uncharged atoms impinging thereon, and means responsive to the ions so formed for producing an electrical signal.

9. Apparatus as claimed in claim 4 wherein said beam projecting means comprises a body of solid material formed of an inter-metallic compound of said element with another element, said compound having a decomposition temperature substantially higher than the melting temperature of said element and substantially higher than the highest ambient temperature expected to be encountered, and means for heating said body to a temperature above its decomposition temperature, whereby said source has extended shelf-life.

References Cited in the file of this patent
UNITED STATES PATENTS

| | | |
|---|---|---|
| 2,306,195 | Szuba | Dec. 22, 1942 |
| 2,422,427 | Louden | June 17, 1947 |
| 2,730,650 | Bruijning | Jan. 10, 1956 |
| 2,743,366 | Hershberger | Apr. 24, 1956 |
| 2,745,014 | Norton | May 8, 1956 |
| 2,789,248 | Brown | Apr. 16, 1957 |
| 2,808,510 | Norton | Oct. 1, 1957 |
| 2,827,589 | Hines | Mar. 18, 1958 |
| 2,849,634 | Crowley-Milling | Aug. 26, 1958 |
| 2,860,278 | Cook et al. | Nov. 11, 1958 |
| 2,879,439 | Townes | Mar. 24, 1959 |
| 2,890,373 | Chodorow | June 9, 1959 |
| 2,944,182 | Rigrod | July 5, 1960 |

OTHER REFERENCES

A Comprehensive Treatise on Inorganic and Theoretical Chemistry by J. W. Mellor, pp. 335 and 947, vol. 6, pub. by Longmans, Green & Co., N.Y.C., 1947.